United States Patent

[11] 3,532,064

[72] Inventors Izaak Anthonie Kreber
 Kronberg, Germany;
 Eduard Kessi, Vevey, Switzerland
[21] Appl. No. 585,595
[22] Filed Oct. 10, 1966
[45] Patented Oct. 6, 1970
[73] Assignee AFICO S.A.
 Lausanne, Switzerland
 a Swiss company
[32] Priority Oct. 18, 1965
[33] Switzerland
[31] 14,337/65

[54] CHOCOLATE MOULDING APPARATUS
 11 Claims, 3 Drawing Figs.
[52] U.S. Cl.................................................... 107/8,
 107/4
[51] Int. Cl...................................................... A23g 1/26

[50] Field of Search............................................ 107/4.7,
 8.4; 99/236, 272

[56] References Cited
 UNITED STATES PATENTS
 1,843,522 2/1932 Sprague........................ 99/272

Primary Examiner—Laverne D. Geiger
Assistant Examiner—Robert I. Smith
Attorney—Blum, Moscovitz, Friedman and Kaplan ABSTRACT: An apparatus for forming light weight, cellular structure chocolate includes a reduced pressure chamber having an endless conveyor and cooling means therein. Two drawer-like transporters are provided for moving chocolate containing moulds into and out of the chamber. The drawer-like transporters maintain the reduced pressure within the chamber as they are operated. The chocolate expands and cools within the chamber and the moulds are moved into and out of the chamber on a continuous basis.

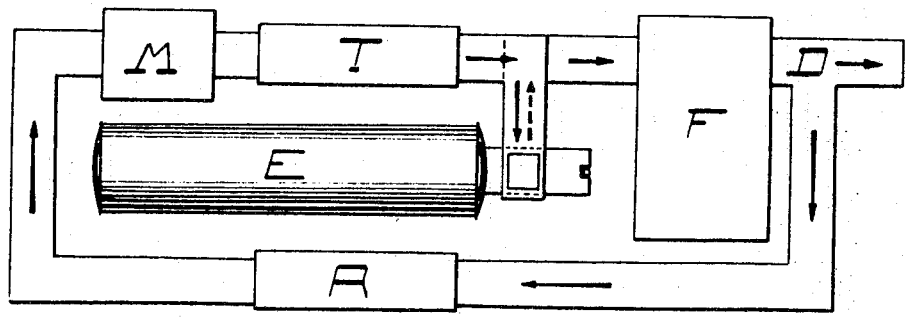
Fig_1
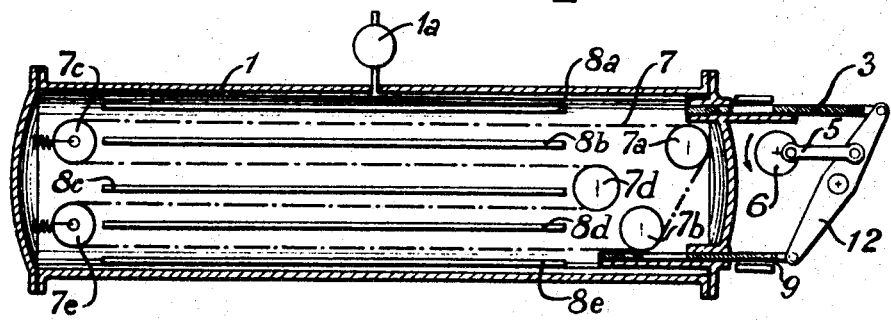
Fig_2
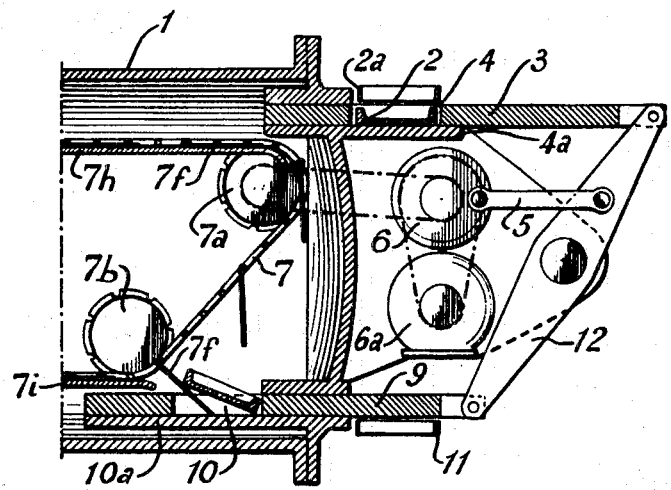
Fig_3

CHOCOLATE MOULDING APPARATUS

This invention relates to the manufacture of food products.

Food products with a cellular structure, more particularly chocolate or confectionery articles at least part of which has such a structure, have certain advantages over the corresponding solid products. As far as the retailer is concerned, they offer a greater volume for a given weight whilst, to the consumer, they are easier to break into pieces and chew, giving a sensation of greater lightness.

It is possible to obtain a product with a cellular structure by mixing with the paste a product such as bicarbonate of soda which makes it rise in the same way as a leavening agent. Unfortunately, such an addition gives the product a strange flavour and is sometimes prohibited by regulations on foodstuffs.

According to another known process, the paste is kept under reduced pressure after moulding and during its hardening. The particular advantage of this process is that it promotes preservation of the product. However, the practical application of this process, is attended by a number of disadvantages. The methods and apparatus used until now are extremely complex whilst the wastage rate in production is relatively high. On the other hand the performance of these various processes involves a large number of manual operations and hence considerable labour.

In one known apparatus, a vacuum chamber is opened at atmospheric pressure during the loading and unloading of a plurality of plates carrying moulds.

There is also a semi-continuous apparatus comprising a series of sealed moulds provided with a check valve. This valve is arranged to be connected to a suction line and, upon closure, enables the chamber within the mould to be kept under reduced pressure. The production of a bar of chocolate in an apparatus of this kind involves the following operations after the actual moulding cycle:

a. Lining the sides of the mould with a fatty substance;
b. Placing the cover in position;
c. Connection to the suction line;
d. Suction;
e. Distributing the moulds on the conveyor belt;
f. Cooling;
g. Removing cover;
h. Opening the mould;
i. Replacing the moulds and covers on a conveyor belt or the like. Of these operations, (a), (b), (c), (e), (g), (h), and (i) are carried out by hand.

Because of the labour they involve, these manual operations reflect heavily on the manufacturing costs.

An object of this invention is to obviate these disadvantages. Accordingly, the invention provides firstly a process for the production of a food product, particularly chocolate or confectionery, which has the advantage of being continuous, i.e. involves hardly any manual operations. This process, in which at least part of the product is distributed in the plastic state in a series of moulds, comprises conveying the moulds to the inlet end of at least one enclosure in which an almost constant reduced pressure is maintained, continuously introducing the moulds into the enclosure in order to expand the mass which is still plastic, circulating the moulds in the enclosure in order at least partly to solidify the mass by heat exchange before it enters into contact with atmospheric pressure, continuously removing the moulds from the enclosure, optionally completing cooling of the product, and, finally, releasing it from the mould.

The invention also provides an apparatus in which the process defined above can be carried out and comprising a series of moulds which can be driven by means of an endless conveyor, the apparatus further comprising a sealed enclosure, means for maintaining a reduced pressure inside the enclosure, an input or feed mechanism for introducing the moulds into the enclosure and a discharge mechanism for removing them from it without affecting the seal to any appreciable extent, and means for circulating the moulds inside the enclosure until the cellular products inside the moulds have at least partly solidified.

One embodiment of the apparatus according to the invention, intended in particular for moulding bars of chocolate, is shown by way of example in the accompanying drawings, wherein:

FIG. 1 is a general, diagrammatic plan of the apparatus.

FIG. 2 diagrammatically illustrates elevation and longitudinal section, a sealed enclosure and means by which moulds can be circulated, and FIG. 3 shows part of the sealed enclosure on a larger scale.

FIG. 1 shows an apparatus which comprises a moulding unit M, a so-called tapping unit T, a sealed enclosure or vacuum chamber E, a refrigeration cabinet F, an extractor unit D and a re-heating unit R in a return path for moulds of the apparatus. All these units with the exception of the enclosure E and its feed and discharge mechanisms, are known and used to a large extent in the chocolate industry. They are connected together by chains or other endless conveyor systems which are able to keep the moulds moving continuously.

As shown in FIG. 1, the moulds follow a main circuit in which they are moulded in the unit M and then tapped in the unit T. They then branch off from this main circuit and are conducted by means of a suitable conveyor to the upper part of the sealed enclosure E. The moulds leave the enclosure E at its lower part and rejoin the main circuit to be cooled in the cabinet F and emptied in unit D. The bars moulded in the moulds are then wrapped whilst the empty moulds return to the moulding unit after having been reheated in the unit R.

The sealed enclosure or vacuum chamber E shown in FIGS. 2 and 3 is in the form of a cylindrical tank 1. A chamber inside the tank 1 can be kept at reduced pressure by means of a pump 1a.

Inside the tank 1, two endless chains 7 parallel to one another pass successively over pairs of sprockets 7a, 7b, 7c, 7d, and 7e. It is preferred that the tension of the chains be constantly adjusted by means of a suitable automatic mechanism, for example by fixing the sprockets to the tank 1 by means of a resilient member or a pneumatic device or the like.

The chains 7 are driven by the sprockets 7a which are in turn driven by an electric motor 6a (FIG. 3). They carry a series of plates 7f with perforated bottoms, each of which is fixed to the chains by a pair of spindles on which they can pivot about an axis perpendicular to the plane of FIG. 3. The plates 7f are also supported during their movement by rails 7h, 7i arranged opposite each of the chains 7 along the rectilinear sides formed by them.

In addition, the tank 1 has cooling elements 8a, 8b, 8c, 8d and 8e through which flows a liquid coolant at a temperature of for example, between 5 and 7°C. These elements are fixed along the path followed by the moulds between the aforementioned rectilinear sides of the chain.

A chain conveyor 2a whose translational movement is perpendicular to the plane of FIG. 3, delivers moulds 2 filled with chocolate in the plastic state from the main circuit to the inlet end of the enclosure E. A device (not shown) which may be of known type and may, for example, include photo-electric cells, enables the feed of the enclosure E to be regulated and controlled in spite of any occasional irregular delivery rate of the conveyors.

The moulds 2 are introduced into the tank 1 by a device which comprises a drawer 3 with an opening 4. A alternating, translational movement is imparted to the drawer 3 by the motor 6a acting through a crank lever system 5, 6 and a balance arm 12. The drawer 3 rests on a table 4a which is integral with the tank 1 and projects outwards from it. This table 4a forms the bottom of the opening 4 when the drawer 3 is open (FIG. 3). When the drawer is closed, the opening 4 opens downwards above one of the plates 7f.

The moulds are discharged from the cylinder 1 by a device which comprises a drawer 9 with an opening 10. This drawer 9, like the drawer 3 of the input or feed unit, has an alternating, translatory movement imparted to it by the motor 6a through the crank lever system 5, 6 and the balance arm 12. The drawer 9 rests on a table 10a integral with the cylinder 1 and projecting inwards from it. This table 10a forms the bottom of the opening 10 when the drawer 9 is closed (FIG. 3). When the drawer 9 is open, the opening 10 opens downwards above the chain conveyor 11.

A chain conveyor 11 is provided to carry the moulds withdrawn from the cylinder 1 along the main circuit, and travels in the opposite direction to the chain 2a.

The operation of the apparatus is as follows:

FIG. 3 shows the drawer 3 in its open position, in which the mould 2 has been brought by the chain 2a into the opening 4. The mould rests on the table 4a and, when the drawer 3 is moved towards the inside of the cylinder 1, it slides on the table until it is inside the chamber. At the end of its travel, the mould 2 is no longer supported by the table and is deposited on to one of the plates 7f.

Due to the usual treatments which it has undergone beforehand, the chocolate mass inside the mould 2 contains, for example, air occluded or dissolved in the mass and invisible to the naked eye. From the moment the mould 2 enters the cylinder 1, the air present in this plastic chocolate mass expands under the effect of the reduced pressure maintained in the cylinder 1 with the result that a plurality of small cells develop in the mass. It is then advisable to keep this mass inside the enclosure for as long as it takes at least partly to solidify by cooling. In the example described, the fact that the chocolate mass should be kept plastic on entry and should be allowed to solidify in the same chamber, before being discharged, prevents rapid cooling. Since the temperature prevailing inside the chamber is generally not lower than approximately 10 to 15°C. the cooling time becomes a factor of considerable importance. In order to obtain adequate solidification of the cellular mass contained in the moulds, the chain 7 travels the length of the cylinder 1 several times. During their movement inside the vacuum chamber, the moulds and the plates 7f supporting them are constantly kept in an almost horizontal position. As hereinbefore described, the plates slide on rails 7h, 7i which skirt the rectilinear sides of the chain 7. When the chains 7 travel over the sprockets 7a to 7e, the plates 7f are supported at their free ends by a device (which may be conventional) which enable them to be kept constantly parallel to one another although the chains follow the curved path imposed on them by the sprockets. A liquid coolant flows through a row of tubes 8a, 8b, 8c, 8d, 8e to enable a suitable temperature to be maintained inside the cylinder 1.

The length of the chains 7, the rate at which they travel and the quantity of heat dissipated by the aforementioned tubes, are such that when the moulds reach the end of their circuit above the drawer 9, the chocolate mass which they contain is solid enough to be discharged at atmospheric pressure without appreciable contraction either of the mass or of the cells.

It will be appreciated that most of the heat to be dissipated consists of the heat given off during solidification of the product, although the product itself does not undergo a substantial drop in temperature. In practice, the product enters the tank 1 in a plastic state at a temperature of around 30°C. and leaves it at a temperature of around 25°C. The absolute pressure inside the tank is around 50 millimetres of mercury (50 torr.).

After the mould 2 has completed its circuit, arriving above the drawer 9 of the discharge unit, it is collected in the opening 10 closed downwards by the table 10a. This drawer operates in the same way as the drawer 3 of the input or feed unit. When the drawer 9 moves from left to right, it removes the mould 2 contained in the opening 10 from the chamber and, at the end of its travel, deposits the mould on to the discharge conveyor 11. The mould 2 then rejoins the main circuit which, as hereinbefore mentioned, passes through a refrigerating cabinet intended to complete the cooling of the mass. The bars of chocolate produced in the moulds are removed from the moulds with their cellular structure after which they are wrapped so that they are ready for consumption. According to the invention, the cells are therefore formed continuously between moulding and mould release.

It has been found that the movements of the drawer 3 must be synchronised with the travel of the chains 7. In one embodiment of the invention, a rigid or semi-rigid driving connection is established between the crank 6 actuating the drawers and the pair of sprockets 7a driving the chain 7 (FIG. 3).

In addition, it is also advisable to reduce the forces involved in the movement of the drawers 3 and 9. These forces are caused by frictional resistance and by the difference in pressure between the inner and outer faces of the drawers. As shown in FIG. 3, the balance arm 12, by transmitting to the drawers the alternating movement controlled by the crank lever system 5, 6 enables the forces arising out of the pressure difference to be balanced out so that they are neutralised. By virtue of this arrangement, the only forces to be overcome are those emanating from the friction of the drawers.

In a modification, the drawers 3 and 9 and the plates 7f are designed to move a plurality, more particularly one pair, of moulds at once.

We claim:

1. An apparatus for making chocolate or confectionery or other food products with a cellular structure, comprising a series of moulds capable of being driven by an endless conveyor, a sealed enclosure, means for maintaining a reduced pressure inside the enclosure, an input or feed mechanism for introducing the moulds into the enclosure, a discharge mechanism for removing the moulds from the enclosure without any appreciable effect on the seal of the enclosure, and means for circulating the moulds inside the enclosure until the cellular products inside them have at least partly solidified, the said feed and discharge mechanisms each including a drawer to which an alternating translational movement can be imparted.

2. An apparatus as claimed in claim 1, wherein each drawer has an opening adapted to contain at least one mould and comprising a table supporting each drawer and forming the bottom of the opening of said drawer when said drawer is in its loading position.

3. An apparatus as claimed in claim 1, comprising an electric motor driving a crank lever system actuating the drawers.

4. An apparatus as claimed in claim 1, wherein the feed and discharge mechanisms are arranged on the same side of the enclosure.

5. An apparatus as claimed in claim 4, including a balance arm connecting the two drawers and balancing out the forces arising out of the difference in pressure to which the drawers are subjected.

6. An apparatus for making chocolate or confectionery or other food products with a cellular structure, comprising a series of moulds capable of being driven by an endless conveyor, a sealed enclosure, means for maintaining a reduced pressure inside the enclosure, an input or feed mechanism for introducing the moulds into the enclosure, a discharge mechanism for removing the moulds from the enclosure without any appreciable effect on the seal of the enclosure, and means for circulating the moulds inside the enclosure until the cellular products inside them have at least partly solidified, means are provided for circulating said moulds within the enclosure, including an endless chain travelling several times the length of said enclosure over a series of sprockets disposed at each end of said enclosure, the circulating means having a series of plates integral with the chain to which they are pivotally connected at one of their ends.

7. An apparatus as claimed in claim 6, wherein the plates are supported by rails skirting the rectilinear sides of the chain.

8. An apparatus as claimed in claim 6, including means keeping the plates loaded with moulds in an almost horizontal position whilst the chain follows a curved path over the sprockets.

9. An apparatus for making chocolate or confectionery or other food products with a cellular structure, comprising a series of moulds capable of being driven by an endless conveyor, a sealed enclosure, means for maintaining a reduced pressure inside the enclosure, an input or feed mechanism for introducing the moulds into the enclosure, a discharge mechanism for removing the moulds from the enclosure without any appreciable effect on the seal of the enclosure, and means for circulating the moulds inside the enclosure until the cellular products inside them have at least partly solidified, means are provided for circulating said moulds within the enclosure, including an endless chain traveling several times the length of said enclosure over a series of sprockets disposed at each end of said enclosure, the circulating means having a series of plates integral with the chain to which they are pivotally connected at one of their ends and means including resilient means adjusting automatically the tension of the chain.

10. An apparatus for making chocolate or confectionery or other food products with a cellular structure, comprising a series of moulds capable of being driven by an endless conveyor, a sealed enclosure, means for maintaining a reduced pressure inside the enclosure, an input or feed mechanism for introducing the moulds into the enclosure, a discharge mechanism for removing the moulds from the enclosure without any appreciable effect on the seal of the enclosure, and means for circulating the moulds inside the enclosure until the cellular products inside them have at least partly solidified, means are provided for circulating said moulds within the enclosure, including an endless chain traveling several times the length of said enclosure over a series of sprockets disposed at each end of said enclosure, and means adapted to synchronise the position of the plates in dependence upon the position of the drawers.

11. An apparatus for making chocolate or confectionery or other food products with a cellular structure, comprising a series of moulds capable of being driven by an endless conveyor which includes a chain, a sealed enclosure, means for maintaining a reduced pressure inside the enclosure, means for maintaining an almost constant temperature inside the enclosure including a row of tubes between rectilinear sides of the chain and through which a liquid coolant can flow, an input or feed mechanism for introducing the moulds into the enclosure, a discharge mechanism for removing the moulds from the enclosure without any appreciable effect on the seal of the enclosure, and means for circulating the moulds inside the enclosure until the cellular products inside them have at least partly solidified.